United States Patent
Fujii

[11] Patent Number: 5,172,563
[45] Date of Patent: Dec. 22, 1992

[54] APPARATUS FOR CONTROLLING AUTOMOBILE AIR-CONDITIONER

[75] Inventor: Kazuo Fujii, Konan, Japan

[73] Assignee: Zexel Corporation, Tokyo, Japan

[21] Appl. No.: 712,042

[22] Filed: Jun. 7, 1991

[30] Foreign Application Priority Data

Jun. 20, 1990 [JP] Japan .................. 2-161836

[51] Int. Cl.$^5$ .............................................. F25B 1/00
[52] U.S. Cl. ...................................... 62/158; 62/228.5
[58] Field of Search ................ 236/91 C; 62/228.5, 62/229, 209, 231, 158; 454/75

[56] References Cited

U.S. PATENT DOCUMENTS 4,894,999  1/1990  Kaiju et al. ................ 62/228.5 X
5,018,362  5/1991  Nagase et al. ............... 62/228.5 X Primary Examiner—William E. Wayner
Attorney, Agent, or Firm—Wenderoth, Lind & Ponack

[57] ABSTRACT

An apparatus for controlling the operation of an automobile air-conditioner of the type including a variable displacement compressor capable of controlling the discharge rate of a refrigerant in response to an externally supplied compressor displacement signal, wherein a total signal is calculated based on at least a vehicle compartment temperature, an outside air temperature, a solar radiation quantity, and a setting signal from a temperature setter, and when a rapid cooling is designated by the total signal, the displacement of the compressor is fixed at a maximum level for a predetermined period of time so as to preclude an undesired drop of the cooling power which would otherwise occur from the middle to the final stage of the rapid cooling operation.

3 Claims, 4 Drawing Sheets

APPARATUS FOR CONTROLLING AUTOMOBILE AIR-CONDITIONER

BACKGROUND OF THE INVENTION

1. Field of the Invention

The present invention relates to an apparatus for controlling an automobile air-conditioner having an externally controllable variable displacement compressor.

2. Description of the Related Art

In automobile air-conditioner controllers, when the temperature in a vehicle passenger compartment is high and hence a rapid cooling is needed, various control functions are abandoned to perform a rapid cool-down operation for a predetermined period of time. Japanese Patent Publication No. 1-56922 discloses a displacement control apparatus for controlling the displacement of a variable displacement compressor based on the detected evaporator temperature and the target evaporator temperature. In this apparatus, when a rapid cool-down of the vehicle compartment temperature is desired, the target evaporator temperature is shifted from a normal target evaporator temperature setting value (first target evaporator temperature setting value) to a second target evaporator temperature setting value which is lower than the first evaporator target temperature setting value. Subsequently, when a predetermined condition is satisfied, a third target evaporator temperature setting value which varies progressively from the second toward the first target evaporator temperature setting value is set.

With this arrangement, when a rapid cool-down of the vehicle compartment temperature is needed after a long parking in the sun, for instance, the evaporator target temperature setting value is lowered from the first evaporator target temperature setting value to the second evaporator target temperature setting value to promote or accelerate the cooling effect. Thereafter, when a predetermined condition is reached (for example, after an elapse of a preset time period), the third evaporator target temperature setting value is set. The third evaporator target temperature setting value changes to progressively approach the first evaporator target temperature setting value whereby the vehicle compartment temperature can be regulated to the desired temperature smoothly.

In addition, there have recently been developed variable displacement compressors of the externally controllable type. One example of such compressors is disclosed in Japanese Laid-open Patent Publication No. 2-31918. The disclosed variable displacement compressor is of the swash plate type (also known as the wobble plate type) having a swash plate pivotally mounted on a drive shaft within a crank chamber and pivotally movable about a hinge ball mounted on the drive shaft. The swash plate is pivotally connected with a plurality of pistons movable back-and-fourth within corresponding cylinder bores in response to oscillation of the swash plate. A pressure control valve disposed in confrontation to the crank chamber operates to reduce the quantity of a working fluid flowing from the crank chamber back to an intake side depending on the magnitude of an electric current ($I_{SOL}$) supplied to the pressure control valve. As the current intensity or strength ($I_{SOL}$) is increased, the pressure in the crank chamber rises to reduce the angle of oscillation of the swash plate and thereby to lower the displacement of the compressor. On the contrary, with a reduction of the current strength, the pressure in the crank chamber goes down, so that the angle of oscillation of the swash plate is enlarged to increase the displacement of the compressor. The current strength ($I_{SOL}$) serving as a compressor displacement control signal is determined by the target post-evaporator temperature $T'_E$ and the post-evaporator temperature $T_E$ such that $|T_E - T'_E| < 1$ is satisfied.

In the case of the automobile air-conditioner having such a variable displacement compressor, when a need for the rapid cool-down operation arises, the target post-evaporator temperature $T'_E$ is lowered to $-10°$ C., for example, and subsequently the thus lowered target post-evaporator temperature is maintained for a predetermined time period. In this instance, if the vehicle compartment temperature is relatively high at the initial stage of the cool-down operation, the post-evaporator temperature $T_E$ is also high and the current strength ($I_{SOL}$) is low on the contrary, so that the compressor is operated at a maximum displacement level. However, from the middle to the final stage of the rapid cool-down operation, the vehicle compartment temperature gradually goes down in response to which the current strength ($I_{SOL}$) is increased progressively to lower the displacement of the compressor and to thereby reduce the air quantity. As a consequence, a cooling power supplied to the vehicle passenger compartment goes down and the desired rapid cool-down of the vehicle passenger compartment cannot be accomplished.

SUMMARY OF THE INVENTION

With the foregoing difficulties in view, it is an object of the present invention to provide an apparatus for controlling an automobile air-conditioner which is capable of maintaining the displacement of a compressor at a maximum level without being influenced by the post-evaporator temperature, thereby keeping the necessary cooling power to preclude the deterioration of the cool-down state.

According to the present invention, there is provided an apparatus for controlling the operation of an air-conditioner for a motor vehicle, comprising: a variable displacement compressor constituting a part of a refrigeration cycle of the air-conditioner for controlling the discharge rate of a refrigerant in response to an externally supplied compressor displacement signal; a thermal load calculation means for calculating a total signal based on at least a vehicle compartment temperature, an outside air temperature, a solar radiation quantity, and a setting signal from a temperature setter; a cool-down judgment means for judging from the total signal calculated by the thermal load calculation means whether or not a rapid cooling is necessary; a cool-down control means for performing a rapid cool-down control when the cool-down judgment means judges it necessary to perform the rapid cooling; and a displacement fixing means for fixing a value of the compressor displacement signal for maintaining a maximum displacement level of the compressor during a predetermined period of time starting from when the rapid cool-down control by the cool-down control means to be performed.

With this construction, while the rapid cooling is performed under the control of the cool-down control means, the displacement of the variable displacement compressor is fixed at a maximum level to prevent the cooling power from dropping in the middle to the final stage of the cool-down control operation. Thus, the desired effect of the rapid cooling can be maintained without suffering deterioration.

The above and other objects, features and advantages of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION

The present invention will be described hereinbelow in greater detail with reference to a certain preferred embodiment shown in the accompanying drawings.

Figure 1:
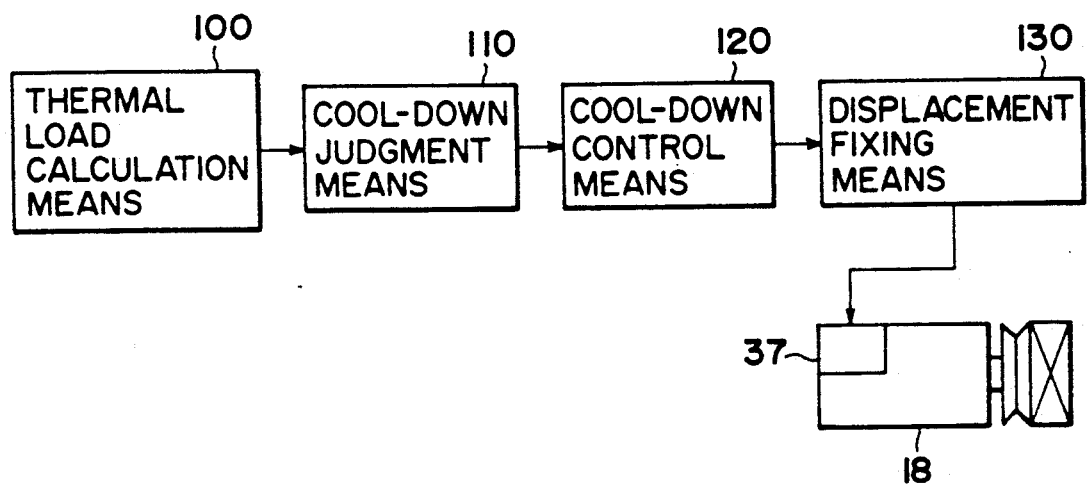
FIG. 1 is a block diagram showing the functional construction of the present invention.

As shown in FIG. 1, an apparatus embodying the invention for controlling the operation of an automobile air-conditioner includes a thermal load calculation means 100 for calculating a total signal based on at least a vehicle compartment temperature, an outside air temperature, a solar radiation quantity, and a setting signal from a temperature setter. The total signal calculated by the thermal load calculation means 100 is then judged by a cool-down judgment means 110 to determine whether or not it is equivalent to a value requiring a rapid cooling. When the cool-down judgment means 110 judges it necessary to perform the rapid cooling, a cool-down control means 120 performs a rapid cool-down control. While the cool-down control is performed under the control of the cool-down control means 120, a displacement fixing means 130 issues a control signal to a displacement adjustment device 37 incorporated in a variable displacement compressor 18 for fixing the displacement of the compressor 18 at a maximum level. Thus, the maximum compressor displacement is maintained throughout the cool-down control operation.

Figure 2:
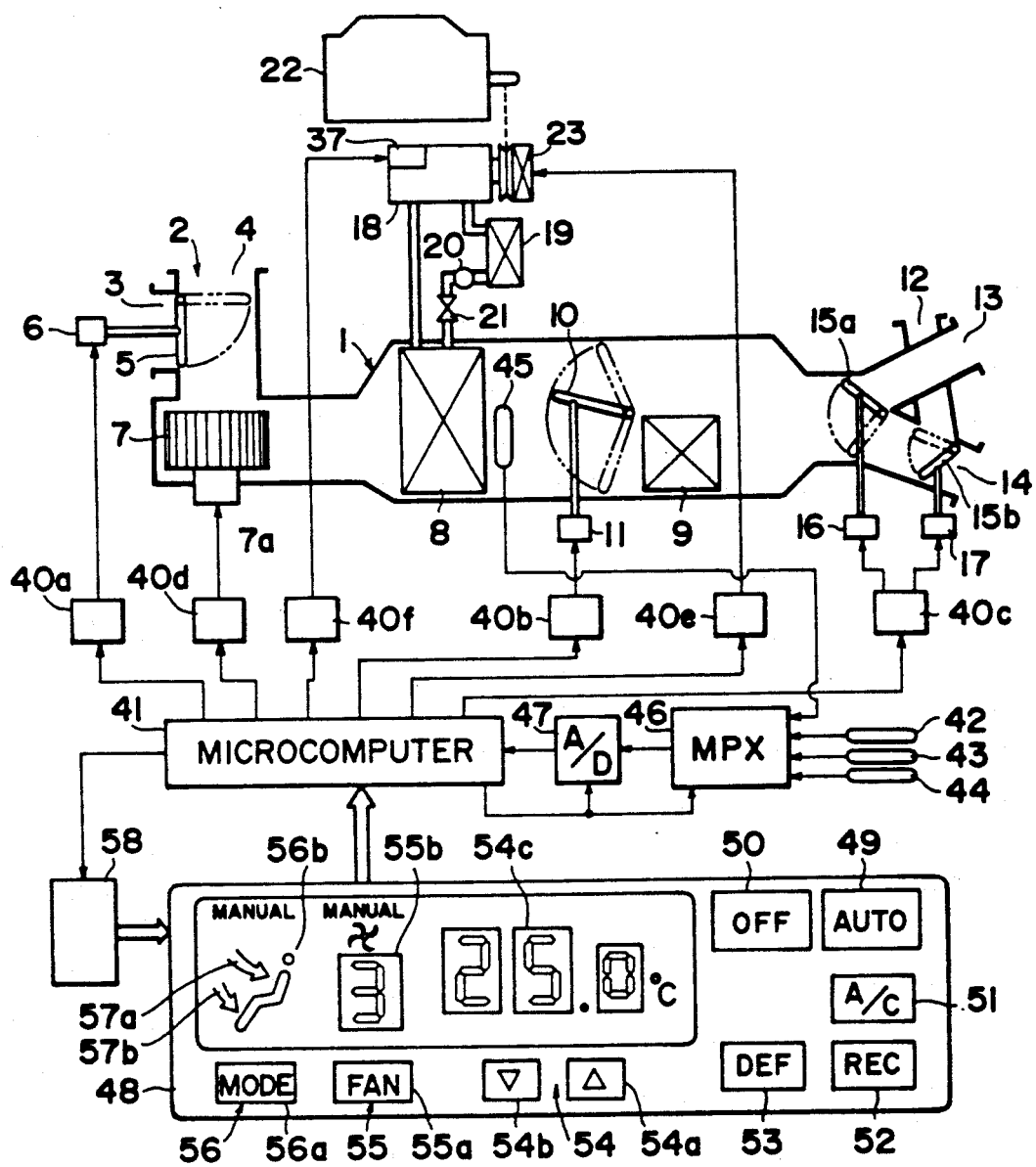
FIG. 2 is a diagrammatical view showing an automobile air-conditioner incorporating a control apparatus embodying the present invention.

FIG. 2 diagrammatically shows an automobile air-conditioner incorporating the control apparatus of this invention. The air-conditioner includes an air-flow duct 1 having an intake air changeover device 2 disposed at an upstream end there. The intake air changeover device 2 includes a selector door 5 disposed at the junction between a recirculating air inlet 3 and an outside air inlet 4 disposed at the upstream end of the air-flow duct 1 in bifurcated fashion. The selector door 5 is actuated by an actuator 6 to select the recirculated air or the outside air to be introduced into the air-flow duct 1.

A blower 7 is disposed in the air-flow duct 1 adjacent to the air inlets 3 and 4 for forcing the air to flow downstream through the air-flow duct 1. The duct 1 also includes an evaporator 8 disposed downstream of the blower 6 and a heater core 9 disposed downstream of the evaporator 8 for circulating engine cooling water to heat air flowing around the heater core 9.

An air-mix door 10 is disposed in front of the heater core 9. The opening of the air-mix door 10 is regulated by an actuator 11 to changed proportions of air flowing through the heater core 9 and air bypassing the heater core 9. The air-flow duct 1 has at its downstream end a defrost outlet 12, a vent outlet 13 and a heat outlet 14 opening to a vehicle passenger compartment in a branched fashion. A mode door 15a is disposed at the junction between the vent outlet 13 and the heat outlet 14, while another mode door 15b is disposed at the junction between the heat outlet 14 and the defrost outlet 12. The mode doors 15a, 15b are actuated by a pair of actuators 16 and 17, respectively, to change over the discharge mode of the air-conditioner.

The evaporator 8 is connected in fluid circuit with a compressor 18, a condenser 19, a reservoir 20 and an expansion valve 21 so as to jointly constitute a refrigeration system to perform a refrigeration cycle of the air-conditioner.

Figure 3:
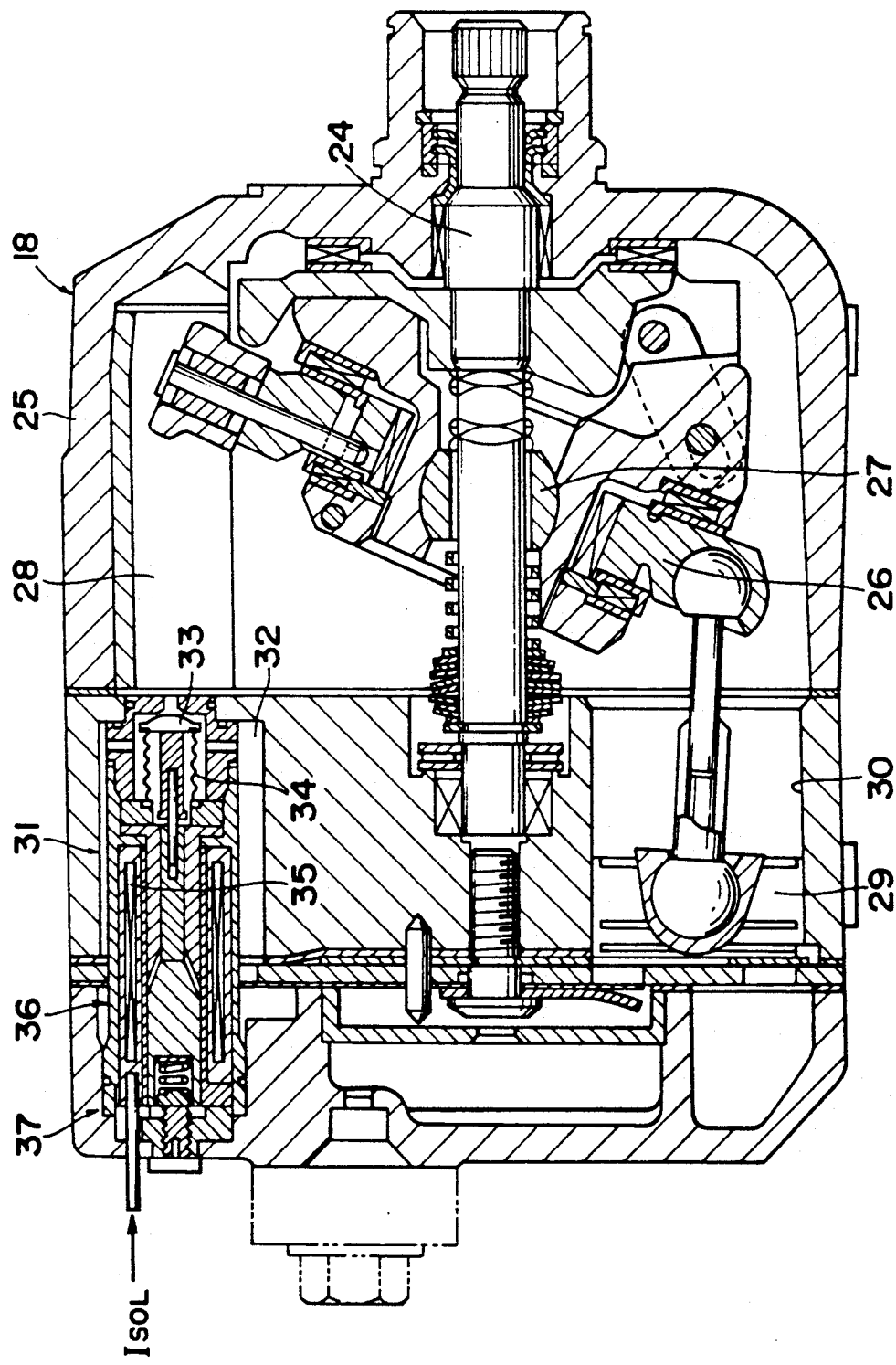
FIG. 3 is a longitudinal cross-sectional view of a variable displacement compressor of the air-conditioner.

The compressor 18 is a swash plate type variable displacement compressor, as shown in FIG. 3 and includes a drive shaft 24 coupled to an engine 22 (FIG. 2) of the motor vehicle via an electromagnetic clutch 23 (FIG. 2). The drive shaft 24 is rotatably received in a body 25 of the compressor 18 and pivotally support thereon a swash plate 26 with a hinge ball 27 disposed therebetween. The swash plate 26 thus pivoted on the drive shaft 24 is pivotally movable or oscillates about the hinge ball 27 within a crank chamber 28 defined in the compressor body 25. The swash plate 26 is pivotally connected with a plurality of pistons 29 (only one being shown) for reciprocating the latter within a corresponding one of plural cylinder bores 30 in response to the oscillation of the swash plate 26. The stroke of the pistons 29 is proportional to the angle of oscillation of the swash plate 26. The compressor 18 further includes a pressure control valve 31 disposed in confrontation to the crank chamber 28. The pressure control valve 31 includes a valve element 33 movable to adjust the degree of flow communication between the crank chamber 28 and an intake chamber 32 communicating the intake side, a pressure-responsive member 34 responsive to the pressure in the intake chamber 32 to move the valve element 33, and a solenoid 36 for driving the valve element 33 in response to the amplitude of an electric current $I_{SOL}$ (hereinafter referred to as "current strength") supplied to an electromagnetic coil 35 of the solenoid 36. By controlling the current strength $I_{SOL}$ from the outside of the compressor 18, the amount of return of a blowby gas from the crank chamber 28 to the intake side. The pressure control valve 31 constitutes a main part of the displacement adjustment device 37 for varying the displacement of the compressor 18. When the current strength $I_{SOL}$ flowing through the electromagnetic coil 35 increases to enhance the magnetic force or intensity of the solenoid 36, the valve element 33 is subjected to a force tending to reduce the degree of flow communication between the crank chamber 28 and the intake chamber 32 and thereby to reduce the amount of the blowby gas returning from the crank chamber 28 to the intake chamber 32. With this reduced return of the blowby gas, the pressure in the crack chamber 28 and hence the pressure acting on the rear end of the respective pistons 29 is increased, so that the swash plate 26 pivots in a direction to reduce the angle of oscillation of its pivotal movement about the hinge ball 27. As a result, the stroke of the pistons 29 and hence the displacement of the compressor 18 is reduced.

In the illustrated embodiment, the displacement adjustment device 37 is constructed to adjust the amount of return of the blowby gas to the intake side by means of the pressure control valve. The displacement adjustment device 37 may be constructed either to change the number of effective cylinders of the compressor 18, or to vary the pulley ratio of a belt transmission mechanism connecting between the engine 22 and the compressor 18. In the case of a sliding vane rotary compressor, the number of effective vanes can be changed. In sum, any measure may be taken as long as it is effective to vary the displacement of the compressor.

As shown in FIG. 2, the actuators 6, 11, 16 and 17, a motor 7a of the blower 7, the electromagnetic clutch 23 of the compressor 18, and the displacement adjustment device 37 are controlled based on output signals delivered through corresponding ones of drive circuits 40a–40f from a microcomputer 41.

The microcomputer 41 is of the construction known per se and includes a central processing unit (CPU), a read only memory (ROM), a random access memory (RAM), an input/output port (I/O), etc, (neither shown). To the microcomputer 41, an output signal from a vehicle compartment temperature sensor 42 indicative of the vehicle compartment temperature $T_R$, an output signal from an outside air temperature sensor 43 indicative of the outside air temperature $T_A$, an output signal from a solar radiation quantity sensor 44 indicative of the solar radiation quantity $T_S$, and an output signal from a duct sensor 45 disposed immediately downstream of the evaporator 8 for detecting the cooling intensity $T_E$ in terms of the temperature of air moving past the evaporator are inputted after they are digitized by an A/D converter 47 in the order selected by a multiplexer (MPX) 46.

The microcomputer 41 is also supplied with output signals delivered from an instrument panel 48. The instrument panel 48 has an AUTO switch 49 for setting all the components of the air-conditioner to an automatically controlled condition, an OFF switch 50 to reset the automatically controlled condition, an A/C switch 51 for manually operating the compressor 18, a REC switch 52 for selecting the intake air between the recirculated air and the outside air, a DEF switch 53 for setting the discharge mode to the defrost mode, a temperature setter 54 for setting the temperature of the vehicle compartment, a speed setter 55 for setting the rotational speed of the blower 7, and a mode setter 56 for setting the discharge mode other than the defrost mode. The temperature setter 54 is composed of up-and-down switches 54a, 54b and a digital temperature indicator or display 54c. By properly actuating the up-and-down switches 54a, 54b, the setting temperature indicated on the digital temperature display 54c can be charged within a predetermined range. The speed setter 55 is composed of a FAN switch 55a for shifting the rotational level of the blower 7, and a digital level indicator or display 55b for indicating the current rotational level. By successively actuating the FAN switch 55a, the rotational level of the blower 7 can be changed between the STOP (level 0), LOW (level 1), MED (level 2), HI (level 3) and MAX HI (level 4) levels. The character "MANUAL" is lighted above the rotational level display 55b. The mode setter 56 is composed of a MODE switch 56a for changing over the discharge modes successively between vent, bi-level and heat modes, and a pictorial indicator or display 56b for indicating the current discharge mode by a picture or illustration. By the actuation of the MODE switch 56a, a selected one of two air-flows indicated by the arrows 57a, 57b is lighted on the pictorial display 56b. The character "MANUAL" is lighted above the display 56b. The lighted display or the displays 54c, 55b, 56b are controlled by the microcomputer 41 via a display circuit 58.

Figure 4:
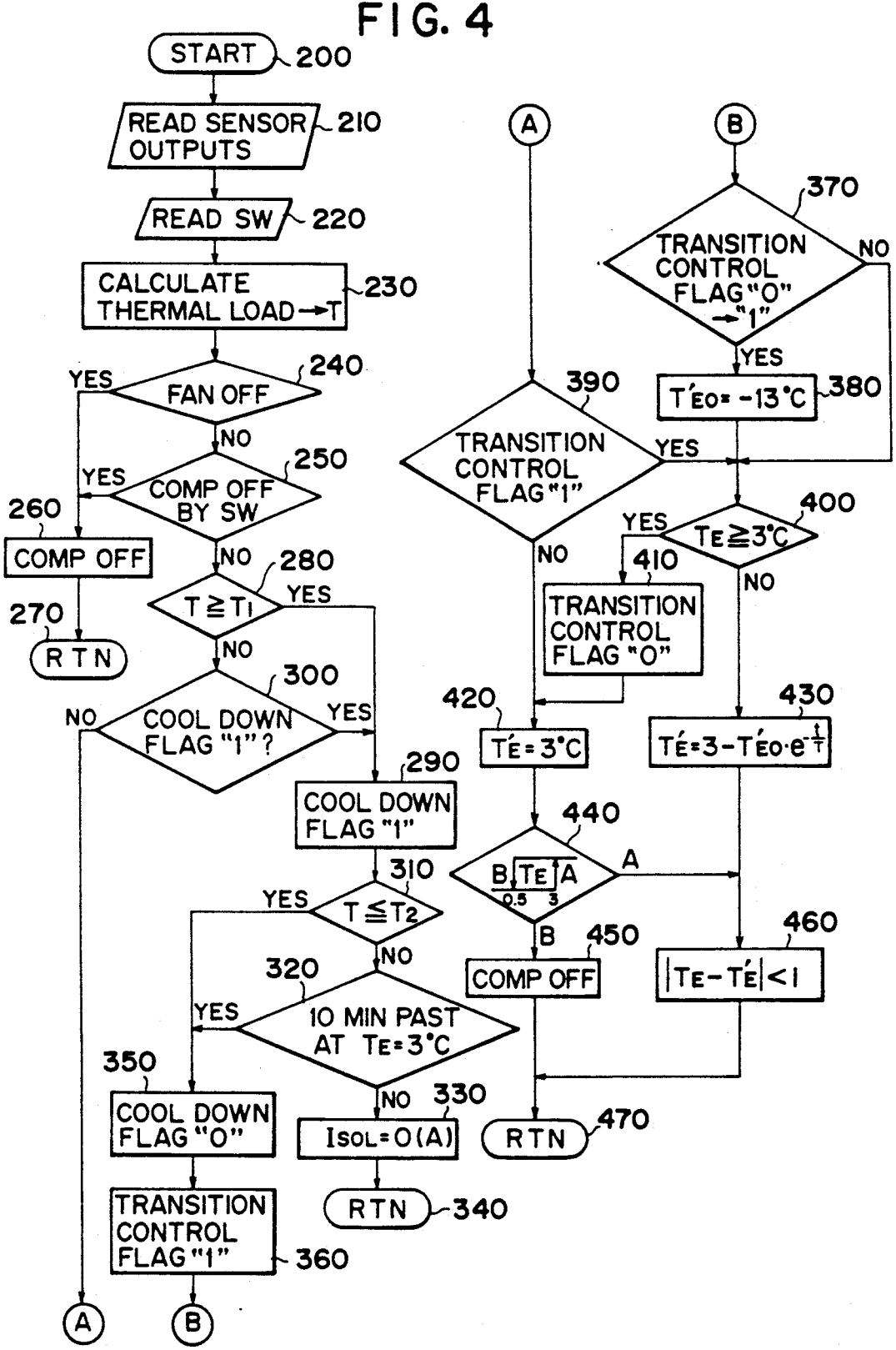
FIG. 4 is a flowchart showing a control routine achieved by a microcomputer for controlling a cool-down operation of the air-conditioner.

FIG. 4 is a flowchart showing a control routine achieved by the microcomputer 41 for controlling the operation of the air-conditioner. The controlling operation will be described hereinbelow in greater detail with reference to the flowchart.

A step 200 regularly starts the control routine of the microcomputer 41 for controlling the compressor 18 from a main control routine which controls all the devices for controlling the air-conditioner and in the next following step 210, output signals from the respective sensors 42 through 45 are inputted in the microcomputer 41. Then the control advances to a step 220 to input various output signal delivered from the instrument panel 48.

Thereafter, a step 230 calculates a total signal T in accordance with the following expression (1) by using the vehicle compartment temperature $T_R$, the outside air temperature $T_A$, the solar radiation quantity $T_S$, the setting temperature $T_D$, and the evaporator cooling intensity $T_E$ that are inputted in the preceding steps 210 and 220.

$$T = K_R(T_R - 25) + K_A(T_A - 25) + K_S \cdot T_S + K_E \cdot T_E$$
$$- K_d(T_D - 25) + C \qquad (1)$$

where $K_R$, $K_A$, $K_S$, $K_E$ and $K_D$ are gain constants and C is a calculation constant.

Then, the control advances to a step 240 in which a judgement is made to determine whether the stop level (level 0) of the blower 7 is selected by the FAN switch 55a. Subsequently, a step 250 judges whether the OFF switch 50 is turned on to stop the compressor 18. If the judgment of these steps 240 and 250 indicates that the stop level (level 0) is selected and the compressor OFF switch is actuated, then the operation of the compressor 18 is stopped on a step 260 and the control returns from a step 270 to the main control routine. On the contrary, if the judgment in the steps 240 and 250 indicates that the blower 7 and the compressor 18 are operating, then the control advances to a step 280.

The step 280 compares the total signal T with a first predetermined value $T_1$ (usually $T_1 = 11$). If $T \geq T_1$, then the control goes on to a step 290. If $T < T_1$, the control advances to a step 300.

The step 290 starts a rapid cooling (cool-down) and sets the flag to "1". In the cool-down control, the target post-evaporator temperature $T'_E$ is set to $-10°$ C. and this condition continues for 10 minutes after the post-evaporator temperature $T_E$ goes down below 3° C.

The step 300 judges whether or not the cool down flag is a "1" or not. If yes, the control goes on to the step 290 to continue the cool-down control. If no, this means that the cool down flag is "0". Then the control advances to a step 390 and subsequently the normal control of the compressor is performed through steps 420 and 440.

A step 310 judges whether the total signal T is greater than a second predetermined temperature $T_2$ (normally, $T_2=2$). Based on the result of this comparison, a decision is made as to whether or not the cool-down is to be reset in view of the thermal load condition. If $T>T_2$ in the step 310, the control proceeds to a step 320 which in turn judges whether the cool down control continues 10 minutes after the post-evaporator temperature $T_E$ becomes equal to or greater than 3° C. If no (10 minutes has not elapsed), the control advances to a step 330. On the contrary, if yes (10 minutes has elapsed), then the control goes on to a step 350.

The step 330 sets the displacement control signal ($I_{SOL}$) to O to thereby fix the displacement of the compressor 18 at a maximum displacement level for 10 minutes and then the control returns to the main control routine on a step 340.

The cool-down control is performed such that the post-evaporator temperature $T_E$ approaches the target post-evaporator temperature $T'_E$. As a consequence, if the cool-down control depends solely on the control of the variable displacement compressor 18 by the displacement control signal ($I_{SOL}$), it occurs likely that the displacement of the compressor 18 is changed (lowered) with a change of the post-evaporator temperature $T_E$. According to this invention, however, since the cool-down control is fixed for a predetermined period of time, the variable displacement compressor 18 operates at a maximum displacement level during the cool-down operation.

If $T \leq T_2$ in the step 310, the control goes on to a step 350 in which the cool-down control is reset. After the cool down flag is set to "0", the control advances to a step 360 which in turn sets the transition control flag to "1". Subsequently, the control proceeds to a step 370.

The step 370 judges whether or not the transition control flag has changed from "0" to "1". If yes, this means that the transition control to shift the cool-down control to the normal control is to be started. Then, the control advances to a step 380 in which the $T'_{EO}$ value used for the calculation of the target post-evaporator temperature $T'_E$ is set to $-13°$ C. This process ensures that the displacement of the compressor 18 is set to the maximum level. If the judgment by the step 370 indicates that the transition control flag has not changed and hence the transition control still continues, the control jumps over the step 380 and goes on to a step 400.

The step 400 judges whether or not the post-evaporator temperature $T_E$ is more than 3° C. or not. If yes, this means that the transition control is not needed. Consequently, the transition control is terminated. Then, the transition control flag is changed from "1" to "0" in a step 410 and subsequently the normal cooling control is performed in a step 420.

A step 430 calculates the target post-evaporator temperature $T'_E$ according to the following expression (2).

$$T'_E = 3 - T'_{EO} \cdot e^{-t/T} \quad (2)$$

where T is a time constant.

The step 430 controls the target post-evaporator temperature $T'_E$ in such a manner that $T'_E$ gradually approaches 3° C. as the time goes on. Subsequently, the control advances to a step 460.

The step 460 changes the displacement of the compressor 18 based on the target post-evaporator temperature $T'_E$ determined by the step 420 or 430 and the post-evaporator temperature $T_E$ in such a manner that $|T_E - T'_E| < 1$ is reached. This change in displacement is carried out by changing the displacement control signal ($I_{SOL}$) which is determined by calculation according to the following expressions (3) and (4).

$$\Delta T_E = T_E - T'_E \quad (3)$$

$$I_{SOL} = K_1 \cdot \Delta T_E + K_2 \cdot \int \Delta T_E dt \quad (4)$$

where $\Delta T_E$ is a deviation between the actual post-evaporator temperature $T_E$ and the target post-evaporator temperature $T'_E$, and $K_1$ and $K_2$ are calculation constants.

The $I_{SOL}$ value thus calculated is used to perform the proportional-plus-integral control (PI control) of the displacement adjustment device 37 by means of which the displacement of the compressor 18 is controlled so as to maintain the deviation $\Delta T$ below 1° C.

Thereafter, the control advances to a step 470 and thence to the main control routine.

If the step 300 judges that the normal control of the compressor 18 is selected, the control goes on to a step 390. The step 390 judges whether or not the transition control flag is a "1" or not. If yes, this means that the transition control is now going on. Then the control advances to the step 400 in which the above-mentioned transition control is performed. If no (transition control flag is "0"), the control goes on to the step 420 which fixes the target post-evaporator temperature to 3° C.

Thereafter, a step 440 is provided to prevent the evaporator from freezing and hence makes a judgment so as to determine whether the post-evaporator temperature $T_E$ is higher then 0.5° C. If no ($T_E<0.5°$ C.), this means that freezing of the evaporator may take place. Then the control advances to a step 450 which in turn stops the operation of the compressor 18. If the evaporator temperature $T_E$ is higher than 3° C. in the step 440, the control goes on to the step 460.

The step 460, as described above, changes the displacement of the compressor 18 based on the target post-evaporator temperature $T'_E$ determined by the step 420 or 430 and the post-evaporator temperature $T_E$ in such a manner that $|T_E - T'_E| < 1$ is reached. Thereafter, the control returns from the step 470 to the main control routine.

The $T'_{EO}$ value used in the step 380 for the calculation of the target post-evaporator temperature $T'_E$ may be replaced by a value determined by using the following expression (5).

$$T'_{EO} = T_E - 23 \quad (5)$$

The $T'_{EO}$ value obtained by the expression (5) is variable with the actual post-evaporator temperature $T_E$, so that the maximum displacement of the compressor 18 can be obtained more reliably than by using the fixed $T'_{EO}$ value.

As described above, according to this invention, when the cool-down control is performed, the displacement of the compressor can be maintained at a maximum level without being influenced by the post-evaporator temperature $T_E$. Thus, the necessary cooling power or intensity is maintained, thereby ensuring that the air-conditioner operates efficiently without causing deterioration in cooling effect resulting from the cool-down control.

Obviously, various minor changes and modifications of the present invention are possible in the light of the above teaching. It is therefore to be understood that within the scope of the appended claims the invention may be practiced otherwise than as specifically described.

What is claimed is:

1. An apparatus for controlling the operation of an air-conditioner for a motor vehicle, comprising:
   (a) a variable displacement compressor constituting a part of a refrigeration cycle of the air-conditioner for controlling the discharge rate of a refrigerant in response to an externally supplied compressor displacement signal;
   (b) a thermal load calculation means for calculating a total signal based on at least a vehicle compartment temperature, an outside air temperature, a solar radiation quantity, and a setting signal from a temperature setter;
   (c) a cool-down judgement means for judging from said total signal calculated by said thermal load calculation means whether or not a rapid cooling is necessary;
   (d) a cool-down control means for performing a rapid cool-down control when said cool-down judgement means judges it necessary to perform the rapid cooling; and
   (e) a displacement fixing means for fixing a value of the compressor displacement signal for maintaining a maximum displacement level of the compressor during a predetermined period of time starting from when the rapid cool-down control by said cool-down control means begins to be performed.

2. An apparatus according to claim 1, wherein the variable displacement compressor is a swash plate type compressor including a swash plate and a pressure control valve for changing the angle of oscillation of said swash plate, said pressure control valve having an electromagnetic valve, and said displacement control signal comprising the magnitude of an electric current supplied to said electromagnetic coil.

3. An apparatus according to claim 2, wherein the magnitude of the electric current supplied to said electromagnetic coil is calculated based on a deviation between an actual post-evaporator temperature and a target post-evaporator temperature, said displacement fixing means fixing said deviation between said actual post-evaporator temperature and said target post-evaporator temperature to a predetermined value.

* * * * *